United States Patent Office 3,452,532
Patented July 1, 1969

3,452,532
MANUFACTURE OF PURIFIED ASBESTOS PRODUCTS
Werner Wilke and Hans Fetzer, Schwabisch, Germany, assignors to Rex Asbestwerke Graf von Rex K.G., Schwabisch Hall, Germany, a German corporation
No Drawing. Filed July 20, 1967, Ser. No. 654,689
Claims priority, application Austria, July 21, 1966, A 7,003/66
Int. Cl. D02g 3/02
U.S. Cl. 57—139         11 Claims

ABSTRACT OF THE DISCLOSURE

Yarn or other products formed of asbestos fiber material by causing the dispersing agent of an asbestos fiber dispersion to become inactive in the shaped product, are liberated from organic and other no-asbestos additives by tempering the product in the absence of oxygen at temperatures above 150° C. The resulting yarn or other product is free of combustible residues and has a softer feel, greater strength and greater elasticity than the untempered product.

---

Our invention relates to methods of producing purified asbestos yarn and other asbestos structures and heating such structures to relatively high temperatures for removing non-asbestos substances. More particularly but not exclusively the invention relates to methods of making yarn or other asbestos bodies in which, as an intermediate manufacturing step, the asbestos fiber is made into a dispersion from which a strand is produced. Shaped structures are then made by spinning and winding the strand.

In the production of shaped asbestos structures, it is a known practice to use auxiliary organic materials. As a rule, the starting material, usually an aqueous suspension of asbestos, is provided with surface active agents, for instance dispersing and wetting agents, such as water-soluble soaps, sodium dodecyl sulphonate or other alkyl-arylsulphonates. The auxiliary additions may also comprise other substances for influencing the chemical and/or physical behavior of the suspension, for instance dispersion stabilizers, viscosity modifying agents, and binding agents.

In the further course of manufacturing the asbestos structures from such dispersions, a physical or chemical treatment is used to destroy the dispersing action of the dispersing agent; thus in the case of dispersing agent in the form of a water-soluble soap, the soap may be converted into an insoluble salt or otherwise removed from solution.

Once the production of bodies from asbestos fiber material is substantially or entirely completed, the auxiliary additives are no longer needed but constitute undesirable impurities. The continued presence of such additives is detrimental even if the asbestos bodies are produced with the aid of further additives serving to modify the properties of the final product, such as filler substances, pigments, or dispersions of synthetic plastics. Aside from causing a gray discoloration, the absorptivity of the fibers for impregnating materials is considerably decreased, and the undesired content of no longer needed additives may then also impair the mechanical strength of the asbestos bodies, particularly of the yarn or thread material of asbestos contained therein.

Various attempts have been made at removing these auxiliary substances but, due to the affinity of the substances to the asbestos fibers, considerable difficulties have been encountered.

For instance, the French Patent 1,383,397 describes subjecting the shaped asbestos structures to drying in an oven followed by a firing treatment. This, however, results in cracking the auxiliary organic compounds and thus produces tarry decomposition products detrimentally affecting the shaped asbestos structures.

According to U.S. Patent 2,972,221, the auxiliary substances can be washed out. Although this affords removing most of the surface active agents, the remainder which cannot be removed by this method, still has an appreciably undesirable effect on the asbestos product. The same applies to the similar method described in the German Patent 1,148,984. With large asbestos bodies the very large specific surface area of asbestos fibers makes the removal of auxiliary materials by washing practically impossible.

It is an object of our invention to provide a method which permits undesirable auxiliary substances, such as soaps, to be removed down to negligible amounts or entirely, without impairing the quality of the asbestos structure.

A further object of the invention is to provide such a method in which the mechanical properties of the asbestos are improved or at any rate are not impaired by the treatment for removing the substances.

A still further object of the invention is to provide for the recovery of the auxiliary substances (or their products of decomposition) contained in the asbestos body, preferably so that they can again be used for the preparation of asbestos dispersions.

To achieve these objects, and in accordance with our invention, we first form a body of asbestos fiber material from a dispersion with the aid of auxiliary additives as mentioned above so as to obtain a shaped body still containing the then undesired non-asbestos substances; and we then subject the shaped body to a heating (tempering) treatment at temperatures above 150° C. under exclusion of oxygen for a sufficient length of time to convert the additives to gaseous or vaporous constitution and removing them from the body, the maximum temperature being below the firing or combustion temperature of any organic additives contained in the body.

A preferred way of excluding oxygen is to use an inert or carrier gas which surrounds the asbestos structure. Another way is to heat the asbestos structure in a bath of molten metal or molten salt. The method thus resembles dry distillation. Preferably used as inert gas or carrier gas is superheated steam. This particularly permits removing soaps in soluble or insoluble form, originally used as a binding agent. A combustion of the organic auxiliary material and the resulting formation of harmful decomposition products is thus avoided.

Preferably the method of the invention is carried out by subjecting the asbestos structure, still containing the precipitated or non-precipitated dispersing agent, in a sealed vessel to the action of a superheated vapor, such as steam, having preferably a temperature between 300 and 450° C. This completely removes the organic auxiliary agents from the strand or other asbestos structure, and the agent can be recovered in the form of a fat or oil. After the treatment, the structure is chemically pure and free of any organic additions. It has a whitish-gray color only slightly different from that of natural asbestos.

We have discovered that the tempering treatment according to the invention substantially improves the quality of the asbestos strand or other structure produced. The loss in weight due to annealing of the fully tempered asbestos products is less than the normal annealing loss of the raw material. The mechanical strength of the tempered asbestos fiber strands or products is substantially greater than that of those made by conventional textile-type spinning. It appears to us likely that short asbestos individual fibers become firmly bonded together to form bundles having a greater total length than the individual fibers themselves, the fibers in such bundles being anchored together by the tempering. Also, randomly tangled fibers appear to be connected together by the tempering treatment so that a bunchwise elastic, more springy asbestos fiber structure is produced.

The explanation for this surprising effect of the tempering treatment probably resides in an atomic exchange occurring between the auxiliary substances, particularly the metallic soaps, and the asbestos molecules on whose surface the exchange takes place. Due to the intensive heating at temperatures between 250° and 450° C., water is evaporated from the asbestos so that occasionally asbestos molecules at the points where fibers intersect become unsaturated and take up metal atoms from the metallic soap. However, bonding forces at the surface of the asbestos molecules also become randomly unsaturated at intersection points of the asbestos fibers and are then predominantly saturated with metal ions from the metal soaps. At the high tempering temperatures there may further occur reactions with metal ions or metal oxides at other reactive localities of the asbestos fiber surface. These various effects lead to a reinforcement of the crystal structure and an improved mutual attachment of the asbestos fibers. In essence the overall effect of the phenomena described may consist in a slight roughening of the fiber surface.

The method in accordance with the invention is suitable for other applications. For example, it can be used to improve the mechanical and spinning properties of asbestos yarn. The application of the method in accordance with the invention to asbestos foam material increases its springiness (bunch elasticity) and greatly reduces the fatigue effect of the material.

In order that the invention may be more readily understood, two examples are described presently.

Example 1

This example deals with the production of asbestos yarn using a discontinuous method of operation. The asbestos yarn was produced from an aqueous asbestos fiber dispersion containing a dispersing agent. The yarn was then shaped from the dispersion and introduced into a precipitating bath for inhibiting the dispersing properties of the dispersing agent. As to the dispersion and method used, the process was substantially as known from our U.S. Patent 2,972,221 or as described in the copending application of H. Guertler, Ser. No. 625,307, filed Mar. 23, 1967 (assigned to the assignee of the present invention).

The resulting yarn, still containing residues of the dispersing and precipitating (inhibiting) media, was spun centrifugally into spinning pots to produce cakes having a height of 192 mm. and a radial thickness of 50 mm. For carrying out the method of the invention the cakes can be stacked if necessary.

The asbestos cakes were placed into a closed container which was connected with a steam supply pipe and with a condenser. The walls of the container could be heated electrically or with hot gas so as to have a surface temperature of 380° C.

After placing the asbestos cakes in the container, the walls of the container were heated electrically to 380° C. At the same time steam was fed into the container at 380° C. and surrounded the asbestos yarn cakes. The steam assisted in heating the asbestos yarn to 380° C. and also entrained the vapors given off by the yarn, for example fatty acids in the case where soaps had been used as dispersing agents for preparing the asbestos fiber dispersion. The steam then carried the entrained vapors to the condenser.

After a period between 3 and 5 hours, depending upon the size of the yarn cakes, the latter had assumed a temperature of 380° C. throughout. The fatty acid vapors condensed in the condenser and then passed through a separator device which separated them from the water condensed from the steam.

Example 2

The following example relates to a continuous method for purifying asbestos yarn. For carrying out the method an elongated, for instance tubular treatment container is preferred provided with air locks at its inlet and outlet positions for preventing the access of oxygen. The container has a connection for the supply of inert carrier gas, such as steam, and a connection for the discharge of this gas and the non-asbestos substances entrained by the gas. The walls of the tubular container are provided with heating means.

The yarn was introduced at a travel speed between 10 and 30 m./min. through an air lock into the container whose temperature increased in the direction of yarn travel from 380° to 500° C. As the yarn passed lengthwise through the container it was acted upon by steam flowing in the opposite direction, at a temperature between 380° C. and 500° C. so that the steam caused auxiliary substances in the asbestos to vaporize. Vaporization of these substances was accelerated by heating the tubular container to 500° C. Steam and vaporized fat from the asbestos passed to a condenser where they were separated. The loss in weight (annealing loss) after the heat treatment was 13 to 14% as compared with 30% prior to the treatment. After the treatment the yarn could not be caused to burn to any extent and had an improved strength and elasticity. Also the yarn had a soft feel and a low coefficient of friction. It was more springy than known asbestos yarn.

In continuous tempering processes of the type represented by Example 2, certain interrelations exist between the travelling length of the material through the tempering zone, the travel speed in the zone, the yarn number (tex), the steam temperature and the water content (in percent by weight) of the yarn. This will be explained with reference to the following data of a specific sample process:

Length of tempering path _____ m__ 3
Travel speed _____ m./min__ 6–7
Yarn number _____ tex__ 470
Steam temperature _____ ° C__ 490
Water content of the yarn entering into the tempering path _____ percent by weight__ 143

These data can be modified in various respects without affecting the quality of the product. For example, doubling the length of the processing container (i.e. the length of the tempering path) permits doubling the travel speed of the yarn, since the duration of the tempering treatment remains the same. All other conditions being equal, a yarn of a coarser tex number requires a slower delivery speed than a finer yarn if at the end of the tempering path the coarse yarn is to be tempered out to the same satisfactory extent as the finer yarn.

As mentioned, the yarn product resulting from the tempering process exhibits different technological properties as the same yarn in the non-tempered condition. The following table indicates measured values of the yarn tex 470 mentioned above:

|  | Before | After |
|---|---|---|
| Yarn tex | 600 | 470 |
| Diameter (mm.) | 0.9 | 0.9 |
| Strength (kg.) | 1.8 | 2.5 |
| Elongation (percent) | 0.6 | 1.8 |
| Annealing loss (percent) | 32.0 | 13.2 |
| Frictional value ($\mu$) | 0.4–0.5 | 0.2–0.3 |

It will be recognized from the table that the tempered product exhibits improved strength and elongation values, as well as reduced annealing losses. The difference between the annealing losses is such that the product, prior to tempering, can be ignited and will then continue burning, whereas after tempering the product can only be made to glow but is no longer inflammable. After tempering the friction value of the product is also reduced remarkably.

The specific gravity of the yarns produced according to the invention is about 0.3 to 0.5 g./cm.$^3$, the annealing losses being 13.2% ±0.2%.

Relative to the applicable tempering temperature, the upper and lower limits—in most cases about 250° C. up to somewhat below 500° C.—depend upon the particular substances involved. As a rule, the uppermost applicable limit is at or near 493° C. because when asbestos is subjected to this temperature the fine filamentary asbestos crystals already commence to lose some of their crystal water. The lower limit must take into account that the above-mentioned additives are to evaporate during tempering. For example, copper stearate commences to evaporate at about 250° C., whereas aluminum stearate does not evaporate unless the temperature is 350° C. or more.

We claim:
1. The method of producing strand and yarn structures from asbestos fiber material with the aid of organic additives, which comprises forming a travelling strand from an aqueous dispersion of asbestos containing an organic dispersing agent, passing the strand of dispersion through a coagulating liquid whereafter the coagulated strand of asbestos contains a residue of organic substances, and subjecting the coagulated strand to heating in the absence of oxygen at a temperature above 150° C. for a sufficient time to distill off said organic residue.

2. The method according to claim 1, which comprises passing during heating a flow of medium an inert gaseous or vaporous medium along the asbestos structure to thereby remove the distilled-off non-asbestos residue.

3. The method according to claim 2, which comprises effecting said heating of said heating of said asbestos coagulated strand in a flow of superheated steam.

4. The method according to claim 1, wherein the tempering temperature is between 250° and about 450° C.

5. The method according to claim 1, which comprises effecting said heating of said asbestos coagulated strand in superheated steam at a temperature between 300° and 380° C.

6. The method according to claim 1, which comprises forming said asbestos dispersion into a strand, spinning the strand to yarn, winding the yarn into a yarn cake, and then subjecting the cake to said distilling heat in superheated steam at a temperature between about 300 to about 400° C. for a period of about 3 to about 5 hours.

7. An asbestos yarn consisting essentially only of pure asbestos fibers free of combustible constituents and having a specific gravity of 0.3 to 0.5 g./cm.$^3$ and an annealing loss of about 13.0% and to about 13.4%.

8. An asbestos yarn consisting substantially of a shaped and spun strand of chemically dispersed asbestos fibers and having a specific gravity of 0.3 to 0.5 g./cm.$^3$ and an annealing loss of about 13.0% to about 13.4%.

9. The method of producing strand material from asbestos fiber material with the aid of organic additives, which comprises forming a travelling strand from an aqueous dispersion of asbestos containing an organic dispersing agent, passing the travelling strand of dispersion through a coagulating liquid whereafter the coagulated strand of asbestos contains a residue of organic substances, and continuously passing the coagulated strand through superheated steam at a temperature between about 250° and about 500° C. along a travel distance sufficient to distill off said organic residue.

10. The method according to claim 9, which comprises passing the travelling coagulated strand through a container and simultaneously passing said superheated steam through the container and along the strand in a flow direction opposed to the strand travel direction.

11. The method according to claim 10, which comprises applying to the strand as it passes through said container a travelling speed between 10 and 30 meters per minute, and increasing the steam temperature along the strand travel in said container from a low to a high temperature within the range of about 380° C. and about 500° C.

References Cited
UNITED STATES PATENTS

| | | | |
|---|---|---|---|
| 2,089,021 | 8/1937 | Foster | 57—139 |
| 2,578,941 | 12/1951 | Novak et al. | 57—156 XR |
| 2,972,221 | 2/1961 | Wilke et al. | 57—58.89 XR |
| 3,157,983 | 11/1964 | Radke | 57—164 |

STANLEY N. GILREATH, *Primary Examiner.*

WERNER H. SCHROEDER, *Assistant Examiner.*

U.S. Cl. X.R.

57—156, 164